United States Patent Office 3,260,704
Patented July 12, 1966

3,260,704
HYDROXYLATED INTERPOLYMERS
AND PREPARATION
Robert J. Slocombe, Kirkwood, Mo., assignor to Monsanto Company, a corporation of Delaware
No Drawing. Filed May 13, 1963, Ser. No. 280,147
18 Claims. (Cl. 260—78.5)

The present invention is directed to interpolymers of vinyl chloride, fumaric esters and isobutylene and to methods of making same.

The invention is particularly directed to interpolymers formed predominantly from vinyl chloride but also from minor amounts of a fumarate and isobutylene, especially such interpolymers of relatively low molecular weight and possessing solubility in designated organic solvents.

It will be understood that when reference is made herein, in the description or in the appended claims, to the presence, amount, content, etc., of particular monomers in a polymer, the reference is to the monomer in whatever polymerized form it may take in the polymer, rather than to unreacted monomer.

The invention is further directed to interpolymers of vinyl chloride, fumaric acid esters and isobutylene in which the moieties with which the fumaric acid is esterified contain reactive functional groups.

In one aspect the invention is particularly directed to interpolymers of vinyl chloride, alkyl hydroxyalkyl fumarates and isobutylene, especially those having contents for example of about 65 to 85% vinyl chloride, about 10% to 25% fumarate, and about 3% to 12% isobutylene, the percentages being by weight of the total polymer.

The invention is further directed to interpolymers of vinyl chloride, di(hydroxyalkyl) fumarate and isobutylene.

The copolymerization of vinyl chloride with certain fumarate esters has been known heretofore. Such copolymers, while suitable for some purposes, have also suffered from various deficiencies. In particular, the presence of hydrogen and chlorine atoms in the copolymer in positions alpha and beta respectively to one of the fumarate carbonyl groups contributed to instability and a tendency toward dehydrohalogenation. In the present invention the isobutylene provides intervening structure between the carbonyl grouping and the chlorine-bearing atom, thereby effecting stability. In addition, the isobutylene affects the polymerization in such a way as to cause production of lower molecular weight polymers. This characteristic is particularly useful for obtaining the relatively low molecular weight polymers required for coating solutions of high solids content but low enough viscosity for proper flow characteristics.

The interpolymers of the present invention are preferably produced from monomers in ratios such that the interpolymer is characterized by a predominance of the structure —(VCl)$_n$—IB—FUM—(VCl)$_m$— wherein the monomer residues represented are vinyl chloride, isobutylene and fumarate ester, and $n$ and $m$ are non-negative integers, $n$ being at least 1. The polymer is further illustrated by the structure:

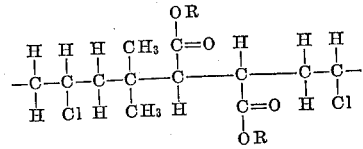

in which R is an esterifying radical. The isobutylene structure further contributes to stability by virtue of the position of the methyl substituents relative to carbonyl groupings, in an effect explainable from the number of hydrogen atoms in certain positions relative to the carbonyl grouping. If a substantial number of the VCl units in a polymer are followed by FUM units, as when the moles of IB are less than those of FUM the polymer stability is inferior, but is still improved to some extent over the vinyl chloride/fumarate copolymer by whatever isobutylene units are present.

The fumarate esters for use in the present process and interpolymers include, for example, those in which one or both R's of the above polymer structure are alkyl, (hydroxyalkyl), etc., for example, such dialkyl fumarates as diethyl, dibutyl, dioctyl, ethyl decyl, butyl octyl, and butyl benzyl fumarates; alkyl hydroxyalkyl fumarates, e.g., ethyl hydroxyethyl, butyl hydroxyethyl, and octyl hydroxyethyl fumarates; dihydroxyalkyl fumarates, e.g., bishydroxyethyl fumarate, i.e., diglycol fumarate. It is also to be understood that monoalkyl fumarates can be interpolymerized with vinyl chloride and isobutylene with advantages resulting from inclusion of the isobutylene to prepare useful interpolymers, although the interpolymers will be different in certain respects because of the presence of the free carboxyl group; for example, monoethyl, monobutyl or monooctyl fumarate can be employed. It will generally be desirable that the alkyl groups in the fumarates not be unduly large, for example, that it be a normal or branched chain in the range of from methyl to dodecyl and aralkyl groups, e.g., benzyl and phenylethyl, are also included as suitable alkyl groups.

The present invention is particularly concerned with interpolymers of vinyl chloride, isobutylene, and diesters of fumaric acid represented by the formula:

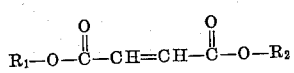

in which R$_1$ is alkyl, including cycloalkyl or alkaryl, aryl, alkaryl, etc., and

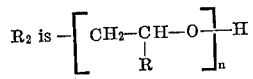

or

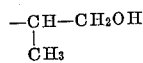

where $n$ is a number of average value from 1 to 8 and R is hydrogen or methyl, e.g., R$_2$ can be 2-hydroxy-n-propyl, hydroxyethoxyethyl, etc., and various hydroxyethoxy or hydroxypropoxy groups. While the foregoing hydroxy alkyl groups are preferred from the standpoint of methods of preparation of the fumarates and the properties of the resulting interpolymers, other hydroxyalkyl groups can be utilized, e.g., 3-hydroxypropyl, 4-hydroxybutyl, hydroxyhexyls, etc., the various 2-hydroxyalkyls being preferred. It is preferred that $n$ in the above formula be 1 and it is also preferred that R be hydrogen, and especially preferred that R$_2$ be 2-hydroxyethyl. It is preferred that R$_1$ be an alkyl of no more than 10 carbons, e.g., methyl, ethyl, propyl, butyl, isobutyl, t-butyl, pentyl, n-hexyl, isohexyl, octyl, decyl, etc. It will be understood that the fumarate esters employed have the trans structure characteristic of fumaric acid and its esters.

The hydroxy-bearing radicals suitable as esterifying groups on the fumarate can conveniently be termed hydroxy(oxa)hydrocarbyl radicals, it being understood that oxygen atoms can interrupt the hydrocarbon units and be present in an alkylene or polyalkylene ether chain, or can be absent leaving a strictly hydrocarbon group between the hydroxy group and the oxygen of the $$-\underset{\|}{\overset{O}{C}}-O-$$

group to which the hydrocarbyl radical is attached. Further specific examples of hydroxyalkyl fumarates suitable for use in the present invention include butyl hydroxyethyl fumarate, phenyl hydroxyethyl fumarate, propyl hydroxyethyl fumarate, hexyl hydroxyethyl fumarate, cyclohexyl hydroxyethyl fumarate, benzyl hydroxyethyl fumarate, ethyl 3-hydroxypropyl fumarate, butyl 3-hydroxypropyl fumarate, butyl 2-hydroxypropyl fumarate, butyl 2-hydroxybutyl fumarate, butyl 4-hydroxybutyl fumarate, etc.

The presence of the hydroxyalkyl fumarates in the interpolymers is advantageous in several respects. The hydroxyl group permits curing, cross-linking, or various other after-treatments to give desired modifications in properties. In addition, the hydroxyl group aids in pigment binding and adhesion properties and contributes to solubility in ketone and other polar solvents. For many coating applications in which resistance to soapy water or other aqueous detergents is required, it is desirable to employ only fairly limited amounts of the alkyl hydroxyalkyl fumarate in the interpolymer and one of the advantages of use of the isobutylene is that it makes possible the attainment of other of the advantageous properties with only limited amounts of the alkyl hydroxyalkyl fumarate. Both the fumarate groups and the isobutylene contribute to solubility of the polymer in organic solvents and to internal plasticization and impact strength.

The monomer content of the present copolymers can vary widely over the gamut of possible proportions, depending upon the properties and applications in view. The relationship of the vinyl chloride to fumarate esters can be suitably treated on a weight basis, the vinyl chloride constituting for example from less than about 35% to more than about 95% by weight of these type monomers in the polymer; while the amount of isobutylene can be considered on a mole basis with respect to the fumarate, e.g., from about 0.5 to 3 or more moles isobutylene being present per mole of fumarate, and the moles of isobutylene preferably being in excess of the fumarate, e.g., from more than 1 to 2 moles isobutylene, per mole of fumarate. Broadly applicable proportions in the polymer are, for example, 45 to 90% vinyl chloride, 8 to 53% fumarate, and 2 to 20% isobutylene, the percentages being by weight. Particularly suitable fumarates for use in the present invention are those in which $R_1$ in the above formula is an alkyl group of 1 to 10 carbon atoms, and $R_2$ is beta-hydroxyethyl. Generally the amount of vinyl chloride will be within a lower, more limited range, e.g., about 50 to 90% by weight of the vinyl chloride and fumarate content, with the isobutylene in the foregoing ranges with respect to the fumarate. When the interpolymer is to be employed as a modified polyvinyl chloride in a surface coating solution, the vinyl chloride content is ordinarily fairly high, for example about 70% to 90% by weight of the total vinyl chloride and fumarate content, with the isobutylene based on the fumarate content as above, for example 0.5 to 2 moles isobutylene per mole of fumarate. The optimum proportions may vary somewhat with the particular fumarate employed, but the foregoing ranges are generally applicable. In particular, the foregoing ranges can suitably be employed when ethyl hydroxyethyl fumarate is the fumarate monomer employed. A particularly suitable and more narrowly defined polymer contains 70 to 78% by weight vinyl chloride, 12 to 22% ethyl hydroxyethyl fumarate and 5 to 11% isobutylene.

In conducting the polymerization process of the present invention, the monomers are employed in the concentrations needed to obtain the desired monomer ratios in the polymer product. As the fumarates enter the copolymer at a fast rate, they can be charged to the polymerization in relatively small amounts, e.g., from fractions of 1% to about 5% by weight of the monomer charge. For example, it would seldom be necessary to exceed 20% by weight of the monomer charge to obtain very high percentages of the fumarate in the polymer, and ordinarily the amount of fumarate charged would be less than 10% by weight, and usually less than about 5% by weight. Of course, it is necessary to replenish the fumarate as used when the polymerization is carried to high conversion if the total fumarate content is to be much higher than that initially charged. It is not necessary to maintain a precisely constant monomer ratio, but the fumarate should be present in substantial amounts at all times if relatively uniform copolymer is to be obtained, and the foregoing percentage amounts can be considered as approximately the maximum amounts to be present during a polymerization to obtain the indicated results. The amounts of isobutylene present in the polymerization mixture will generally be greater on a molar basis than the amounts of fumarate, for the isobutylene tends to enter the copolymer at a slower rate. For example, from 2 to 20 or more moles isobutylene may be employed per mole of fumarate. A monomer mixture suitable for obtaining an interpolymer for surface coating can contain about 85 to 95% by weight vinyl chloride, 1 to 6% by weight fumarate and 5 to 10% by weight isobutylene. Such proportions can be employed when the fumarate is ethyl hydroxyethyl fumarate, but the more preferred proportions are about 88 to 92% vinyl chloride, about 2 to 3% fumarate and 5 to 10% isobutylene, all proportions being by weight.

The fumarates employed in the present invention enter the polymer at a faster rate than vinyl chloride. Hence, heterogeneous polymer can be obtained by simply continuing an ordinary batch polymerization to fairly high conversion without adding additional monomer. However, it is generally desirable to obtain a fairly uniform polymer product; this can be done by stopping the polymerization, or discharging materials from the reactor at a fairly low conversion, e.g., at a point where substantially all the fumarate has been polymerized. Alternatively, a relatively uniform ratio of unpolymerized monomers can be maintained by addition of fumarate or vinyl chloride, fumarate and isobutylene, or by removal of vinyl chloride and isobutylene at the proper rate.

The copolymers of the present invention can be produced in various molecular weight ranges; however, it is preferred that they have molecular weight ranges of the order of 1000 to 25,000 or more particularly, 1000 to 10,000 (number average molecular weights as determined by vapor phase osmometer). In solution and coating applications the use of relatively low molecular weights, often less than 5000, is important with respect to solubility and viscosity, and it is also significant with respect to obtaining low melt viscosity for laminating applications. For solution applications, copolymer having a viscosity in the range of about U to about X on the Gardner scale measured as a 50% solids solution in a 50:50 weight mixture of methyl isobutyl ketone:toluene is particularly suitable. For solution applications in general, it is desirable that the copolymers be soluble in toluene, xylene or other aromatic hydrocarbon solvents at 50% by weight or higher solids concentrations, and also in ketone solvents, or in mixtures of aromatic and ketone solvents, containing for example up to 50% of methyl isobutyl ketone or 4-methoxy-4-methyl-pentanone-2, in contrast to the very limited solubility of polyvinyl chloride in toluene, xylene or such ketones as methyl ethyl ketone, although lesser concentrations such as 30% or 40% by weight can at times be used.

For example, a terpolymer of 76% vinyl chloride, 15% ethyl hydroxyethyl fumarate and 9% isobutylene having a molecular weight of 3500 met the solution viscosity requirements, and related terpolymers of 3000 to 4000 molecular weight similarly meet the requirements.

The copolymers of the present invention are prepared under conditions suitable for free-radical catalyzed polymerization of vinyl compounds. The polymerization is generally conducted at slightly elevated temperatures at atmospheric or autogenous pressures in the presence of peroxide or azo catalysts. Temperatures of the order of 50 to 100° C., are preferred, and it is generally desirable not to exceed temperatures of 140–150° C., because of thermal stability considerations. If desired, low temperature catalysts, e.g., trialkyl boron in combination with oxygen, can be employed to conduct the polymerization at very low temperatures, e.g., −20 or −30° C., or lower, or the polymerization can be effected at room temperature. The temperature and amount of catalyst can be regulated to control molecular weight of the copolymer, higher temperatures and higher amounts of catalysts causing production of lower molecular weights. The polymerization media also influence molecular weight, polymerization in solution, for example, resulting in lower molecular weight copolymer than obtained in emulsion polymerization. Solution, mass, or emulsion polymerization systems can be employed in the present invention. When use of the copolymer as a solution for coating applications is contemplated, it will often be desirable to conduct the polymerization in solution. Various hydrocarbon or ketone solvents are suitable as solution media, e.g., xylene, toluene, benzene, acetone, cyclohexanone, n-hexane, kerosene, etc. It at times is desirable to use a solvent which dissolves the monomers but which has little or no solvent power with respect to the polymer, causing the polymer to precipitate as formed.

The azo catalysts are especially suited for use in the present invention as they have a smaller effect on polymer properties by presence as end groups, a factor which is particularly significant when the polymers are of relatively low molecular weights. The fact that isobutylene is employed as one of the monomers has a significant effect upon the polymerization conditions utilized. The isobutylene tends to cause production of lower molecular weight polymers, thereby making it possible to employ lower polymerization temperatures than would otherwise be practical for preparing low molecular weight product. For example, temperatures below 100° C., such as 80° or 90° C., are used rather than 100° C., or 110° C. Since the higher temperatures cause some degradation with deleterious effects upon polymer properties, it is advantageous to be able to operate at the lower temperatures.

Various catalysts can be employed in the polymerization of the present invention, for example, inorganic or organic peroxide, azo catalysts and redox catalysts. Azo catalysts such as those illustrated in U.S. Patents Numbers 2,471,959, 2,515,628, 2,520,338, 2,520,339, and 2,565,573 can be employed; to further illustrate azobisisobutyronitrile methyl azobisisobutyrate, and diethyl-2,2′-azobis-(2-methyl propionate) are suitable. Peroxy catalysts such as peroxides or carbonates can be employed, e.g., ditertiarylbutyl peroxide, benzoyl peroxide, lauroyl peroxide, tert-butyl perbenzoate, etc. Various boron hydride or alkyl boron catalysts can also be employed, e.g., trialkyl boron in combination with oxygen. In general it is preferred to utilize the azo catalysts as they have less tendency to affect the polymer properties by initiator fragments in the polymer, than do such peroxide catalysts as, for example, lauroyl peroxide. In addition, if amines are employed in the polymerization, they have less tendency to react with azo catalysts than with peroxide catalysts.

It will be recognized that the amounts of catalyst can vary considerably, depending upon the desired polymer properties and efficiencies of the catalysts, but the amounts will ordinarily be less than 2%, by weight of the monomers, and generally in the range of about 0.005 to 0.5% by weight of the monomers, and in the case of azobisisobutyronitrile, about 0.01% to 0.1% by weight of the monomers to make low molecular weight polymer suitable for surface coatings, and comparable amounts on a molar basis of other initiators.

The purity of the fumarate monomer employed in the present process has an important bearing on the properties of the resulting copolymer, although the amounts of the impurities which can be tolerated will vary considerably with the impurity and the contemplated uses of the copolymer. Ethyl hydroxyethyl fumarate, for example, may contain various amounts of diethyl fumarate, ethyl hydroxyethoxyethyl fumarate, monoethyl fumarate, bishydroxyethyl fumarate, glycol bis(ethyl fumarate), etc. In general it is advisable to avoid the presence of free acid groups, such as in monoethyl fumarate. Crude hydroxyethyl ethyl fumarate ordinarily contains about 6% by weight of monoethyl fumarate. This can be reduced to about 3% by weight by vacuum distillation and to less than 1% by weight by converting the monoethyl fumarate to its alkali salt or similar procedures. The monoethyl fumarate, if present, enters the copolymer and the resulting free carboxyl groups tend to cause color formation, cross-linking and poor solvent solubility of the copolymer. It is desirable that the fumarates employed contain less than 5%, for example, less than 2% and preferably less than 1% of fumarate monoester. For example, monomer requiring less than about 0.14 milliequivalent base/gram for neutralization or more preferably less than about 0.105 milliequivalent base/gram is suitable. Because of the various unpredictable effects of various impurities and possible side reactions, the present process as a matter of course utilizes previously prepared monomers rather than attempting to effect ethoxylations, esterifications, etc., of the fumarate during the polymerization reaction. Of course, there are a number of types of fumarate monomers disclosed herein as suitable, and mixtures of such types can be employed, and in such cases there may be some interaction between the fumarate monomers such as ester exchange and the like. It will also be recognized that the present polymers can contain small amounts of polymerizable vinyl monomers in addition to those which are essential in the present invention.

With respect to fumarate monoesters, it has also been found possible to minimize their effect in the polymerization mixture by including a base in the polymerization mixture, particularly an organic amine, as disclosed and claimed in copending application Serial No. 280,148 filed on May 13, 1963. Amines form cations with the fumarate monoesters thereby preventing them from taking part in the polymerization. Tertiary amines, particularly tertiary aliphatic amines, are especially suited for such use, e.g., such trialkyl amines as trimethylamine, tripropylamine, triisopropylamine, tributylamine, triamylamine, trihexylamine, diethylmethylamine, etc., particularly such amines in which the alkyl groups have 1 to 10 carbon atoms. Primary and secondary amines can also be employed, e.g., ethylamine, n-hexylamine, ethylmethylamine, etc. Aromatic amines can also be employed, although care should be exercised to avoid any undue inhibition of the polymerization. Various heterocyclic amines, e.g., pyridines, piperidines, morpholines, etc., are also suitable. In general it is preferred that the amine be hydrocarbon in structure aside from the amino nitrogen atom. For good results the amine should be employed in at least substantially a stoichiometrically equivalent amount to fumarate monoester present in the polymerization mixture, and this should not be greatly exceeded for optimum results, although larger amounts can be employed. Ordinarily the amount of amine will be approximately 1 to 1.5 moles per equivalent of acid in the monomers. A large excess is undesirable as it tends to cause splitting out of HCl and generation of color. Moreover, a large excess of amine causes undue inhibition of catalyst with lowered conversion rates.

The interpolymers containing low carboxyl content, i.e., low fumaric monoester content, are of especial interest whether prepared by utilizing low acidity monomer, or by utilizing bases in the polymerization.

The interpolymers are of especial interest when the monoethyl fumarate content is no greater than 2% by weight, preferably no greater than 1.5% by weight. The desired low acid copolymers will have acidity such that no more than 0.14 milliequivalent base/gram of copolymer is necessary for neutralization, and preferably no more than 0.105 milliequivalent base/gram copolymer.

The invention is illustrated by the following examples.

*Example 1*

A reactor was charged with monomers composed of 92.8% vinyl chloride, 1.9% ethyl hydroxyethyl fumarate and 5.3% isobutylene, all percentages being by weight, and polymerized at 90° C., for 12 minutes and a 3.8% conversion, employing 0.071% azobisisobutyronitrile (0.025 mole percent on monomers) and with methyl isobutyl ketone in an amount of 15 ml./47.5 grams monomer. The resulting interpolymer analyzed as 45.13% chlorine and 1.2% hydroxyl and a composition of 79.6% vinyl chloride, 12.6% ethyl hydroxyethyl fumarate and 7.4% isobutylene, all of the percentages being by weight. The interpolymer was of relatively low molecular weight, having a Gardner viscosity rating of Y as a 48% solids solution in 50:50 methyl isobutyl ketone/xylene. The polymer when baked on steel 15 minutes at 150° C., exhibited no failure in impact, bend and adhesion tests, and also strong resistance to an aqueous detergent. A polymer prepared under similar conditions with monomers composed of 91.7% vinyl chloride, 2.9% ethyl hydroxyethyl fumarate and 5.3% isobutylene, all of the percentages being by weight had a viscosity of V on the Gardner scale in the same test solution and similarly exhibited no failure in impact, bend and adhesion tests. Coatings of greater hardness were obtained when 3% by weight of urea-formaldehyde resin sold under trademark "Resimene" U–920 was added prior to curing. In the foregoing polymerization, triethylamine was added along with the monomers in an amount sufficient to neutralize the acid content of the ethyl hydroxyethyl fumarate, 0.002 g. TEA per acidity unit expressed as mg. KOH/gram of the fumarate being employed. In this and other examples, unsubstituted fumarates, e.g., diethyl fumarate, can be substituted for the ethyl hydroxyethyl fumarate to obtain the corresponding terpolymer of similar properties except for those due to the hydroxyl group such as adhesion properties and suitability for cross-linking by various reagents. The dialkyl fumarates provide plasticization and the isobutylene contributes stability against dehydrohalogenation.

*Example 2*

A monomer charge composed of 92% vinyl chloride, 3% ethyl hydroxyethyl fumarate and 5% isobutylene was polymerized in a 2.4 liter closed reactor (gauge pressure about 200 p.s.i.) equipped with stirrer at 90° C., for about 10 minutes for a conversion of 5.1% (based on wt. polymer/wt. monomers). As initiator, 0.07 gram azobisisobutyronitrile per 100 grams monomers was employed, and acetone was present in 0.3 ml./gram of monomers. The reactor contents was emptied into cold methanol and the polymer was separated and dried. The polymer was formulated and baked on steel for 15 minutes at 150° C., to give a polymer showing good performance in impact strength, bend and adhesion tests and having good hardness. Analysis showed the polymer to be 74.1% vinyl chloride, 20.2% ethyl hydroxyethyl fumarate and 5.7% isobutylene, all percentages being by weight. The polymer had a Gardner viscosity of W, as a 50% solids solution in 50:50 methyl isobutyl ketone/xylene. A polymer prepared under similar conditions, except that triethylamine in stoichiometric amount to neutralize acid in the fumarate was added, and having a fumarate content of 19.5% by weight resulting from use of 3% fumarate in the charge, exhibited good properties in the impact, adhesion, hardness and bend tests. Butyl hydroxyethylfumarate can be substituted for the ethyl hydroxyethyl fumarate to give of polymer of similarly good properties.

*Example 3*

In a continuous polymerization monomers and methyl isobutyl ketone solvent were charged at a total feed rate of 2453 grams/hour, vinyl chloride constituting 60%, ethyl hydroxyethyl fumarate 3.6% and isobutylene 6.1% by weight of the feed, along with 1.75 grams initiator per hour, and a polymer sample was 73.4% vinyl chloride, 19.2% ethyl hydroxyethyl fumarate and 7.4% isobutylene and had a Gardner viscosity of V in 50% solution. A panel coated with the formulated polymer gave no failures in bend and adhesion tests and was of acceptable hardness and good impact strength, failing only 3 out of 16 times when subjected to the impact of a 1 pound weight dropped 50 inches. A later sample taken when vinyl chloride was 56%, ethyl hydroxyethyl fumarate 3.9% and isobutylene 4% by weight of the feed to give a polymer of 75.4% vinyl chloride, 17.85% ethyl hydroxyethyl fumarate and 6.75% isobutylene by weight and Y viscosity gave a coating of acceptable hardness which exhibited no failures in the impact, bend and adhesion tests.

*Example 4*

At 80° C., 92.7% vinyl chloride, 2.1% diglycol fumarate and 5.2% isobutylene, the percentages being by weight of total monomers, was charged to a reactor with 0.07% by weight azobisisobutyronitrile and polymerized for 15 minutes to a conversion of 5.3% to give a polymer having a 78.4% vinyl chloride content. The polymer exhibited better solubility than vinyl chloride/diglycol fumarate copolymers, being soluble in an amount of 40% by weight of solutions in 50:50 methylisobutyl ketone and xylene. Films of the polymer had acceptable adhesion and hardness properties and fair impact strength. Altering the charge to give polymer of 69.6% vinyl chloride content gave 50% solubility and otherwise similar properties.

*Example 5*

A polymer was made as in Example 4 but utilizing 90.9% vinyl chloride, 2% diglycol fumarate, 1.7% diethyl fumarate and 5.3% isobutylene, the percentages being by weight, to give a polymer of 67.9% vinyl chloride content, which gave film of good impact, bend, adhesion and hardness properties. The specified weights of diglycol fumarate and diethyl fumarate constituted about a 1:1 molar ratio. In a procedure employing a higher polymerization temperature, 90° C., 0.3 wt. percent initiator, and 92% vinyl chloride, 2% diglycol fumarate, 1% diethyl fumarate and 5% isobutylene and polymerizing to 3.1% conversion a polymer of 76.8% vinyl chloride content was obtained having good adhesion, hardness and impact properties.

*Example 6*

Vinyl chloride, ethyl hydroxyethyl fumarate and isobutylene were charged in a weight ratio of 82.5/0.9/16.5 to give a polymer of 82.1% vinyl chloride content and 0.77% hydroxyl content. A sample of the polymer was digested in boiling pyridine and then titrated with standard alkali and the percentage of HCl removed was calculated as 0.59%. This low value indicates good stability against dehydrohalogenation to discolored material. Under comparable conditions a vinyl chloride/diethyl fumarate copolymer of 58% vinyl chloride content lost 4.56% HCl, and a vinylchloride/ethyl hydroxyethyl fumarate copolymer lost 3.28% HCl. A vinyl chloride/vinyloxyethanol copolymer, not having the fumarate group, was relatively stable to dehydrohalogenation.

What is claimed is:

1. An interpolymer of vinyl chloride, fumaric acid diester and isobutylene in which the esterifying groups are selected from the group consisting of hydroxyalkyl groups containing no more than 6 carbon atoms and alkyl groups containing no more than 10 carbon atoms, the vinyl chloride being in the range of 45 to 90%, the fumaric acid diester 8 to 53%, and isobutylene, 2 to 20% of the interpolymer with the amounts of the foregoing monomers being limited to a total of 100% by weight of the interpolymer and the interpolymer being produced by free-radical catalyzed polymerization of the foregoing monomers in admixture.

2. An interpolymer of vinyl chloride, isobutylene and an alkyl hydroxyalkyl fumarate in which the alkyl group contains no more than 10 carbon atoms and the hydroxyalkyl group no more than 6 carbon atoms, the interpolymer being produced by free-radical catalyzed polymerization of the foregoing monomers in admixture.

3. The interpolymer of claim 2 characterized by having a free carboxyl content, calculated as monoethyl fumarate, of no more than 1.5% by weight of the interpolymer.

4. The interpolymer of claim 1 in which the monomeric composition is fairly uniform, being produced by maintenance of a relatively uniform ratio of the monomers during the polymerization.

5. An interpolymer of vinyl chloride, isobutylene and fumaric acid diester in which one esterifying group is alkyl containing no more than 10 carbon atoms, and the other esterifying group is selected from the group consisting of

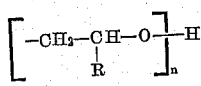

and

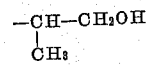

in which $n$ is a number of average value from 1 to 8 and R is selected from the group consisting of hydrogen and methyl.

6. An interpolymer of vinyl chloride, a fumaric acid diester and isobutylene of number average molecular weight no greater than 10,000 with the vinyl chloride constituting about 70 to about 90% by weight of the vinyl chloride and fumaric ester, and the isobutylene amounting to about 50% to about 300% on a molar basis of the fumaric acid diester with the amounts of the foregoing monomers being limited to a total of 100% by weight of the interpolymer and the interpolymer being produced by free-radical catalyzed polymerization of the foregoing monomers in admixture, the esterifying groups in the aforesaid fumaric acid diester being selected from the group consisting of hydroxyalkyl groups containing no more than 6 carbon atoms and alkyl groups containing no more than 10 carbon atoms.

7. The interpolymer of claim 6 further defined by a number average molecular weight of about 3000 to 4000.

8. The interpolymer of claim 2 in which the interpolymer is of about 65% to about 85% vinyl chloride, about 10% to about 25% of the fumarate and about 3% to about 12% of the isobutylene, all percentages being by weight and limited to a total of 100% by weight of the interpolymer.

9. The interpolymer of claim 8 in which the fumarate is ethyl hydroxyethyl fumarate.

10. An interpolymer of vinyl chloride, ethyl hydroxyethyl fumarate and isobutylene, the interpolymer being produced by free-radical catalyzed polymerization of the foregoing monomers in admixture.

11. An interpolymer of about 70 to about 78% vinyl chloride, about 12 to about 22% ethyl hydroxyethyl fumarate, and about 5 to about 11% by weight isobutylene, with the amounts of the foregoing monomers being limited to a total of 100% by weight of the interpolymer and the interpolymer being produced by a free-radical catalyzed polymerization of the foregoing monomers in admixture and having a viscosity in 50% solution in 50:50 methyl isobutyl ketone/xylene in the range of U to Y on the Gardner scale.

12. The method of preparing interpolymers which comprises interpolymerizing vinyl chloride, fumaric acid diester and isobutylene in the presence of free radical catalyst at temperatures of about 50 to about 100° C., and charging the monomers so that the fumaric acid diester does not exceed 10% by weight of the total of the foregoing monomers in the polymerization mixtures and about 2 to 20 moles of isobutylene are present per mole of fumaric acid diester, the esterifying groups in the fumaric acid diester being selected from the group consisting of hydroxyalkyl groups containing no more than 6 carbon atoms and alkyl groups containing no more than 10 carbon atoms.

13. The method of preparing interpolymers which comprises polymerizing vinyl chloride, alkyl hydroxyalkyl fumarate and isobutylene in the presence of a free radical catalyst and charging the monomers in amounts of 85 to 95% vinyl chloride, 1 to 6% fumarate and 5 to 10% isobutylene, the percentages being by weight based on and limited to a total of 100% of the monomers charged, the alkyl hydroxyalkyl fumarate having alkyl groups of no more than 10 carbon atoms and hydroxyalkyl groups of no more than 6 carbon atoms.

14. The method of claim 12 in which the catalyst is selected from the group consisting of azo and peroxide catalysts.

15. The method of claim 12 in which alkyl hydroxyalkyl fumarate in which the alkyl group contains no more than 10 carbon atoms and the hydroxyalkyl group no more than 6 carbon atoms is employed and contains less than 1% by weight of incompletely esterified fumarate, calculated as monoethyl fumarate.

16. The interpolymer of claim 1 in which the fumaric acid diester includes at least two fumaric acid diesters.

17. The interpolymer of claim 2 in which the monomeric composition is fairly uniform, being produced by maintenance of a relatively uniform ratio of the monomers during the polymerization.

18. The method of preparing interpolymers which comprises polymerizing in contact with a free-radical catalyst a mixture of vinyl chloride, alkyl hydroxyalkyl fumarate and isobutylene in which the alkyl group contains no more than 10 carbon atoms and the hydroxyalkyl group no more than 6 carbon atoms.

References Cited by the Examiner
UNITED STATES PATENTS
3,159,610    12/1964    Slocombe et al. ------ 260—92.8

FOREIGN PATENTS
501,669    5/1939    Great Britain.

JOSEPH L. SCHOFER, *Primary Examiner.*

L. WOLF, *Assistant Examiner.*